Dec. 27, 1949     H. A. JOHNSON     2,492,578
WELDING ELECTRODE
Filed May 16, 1949
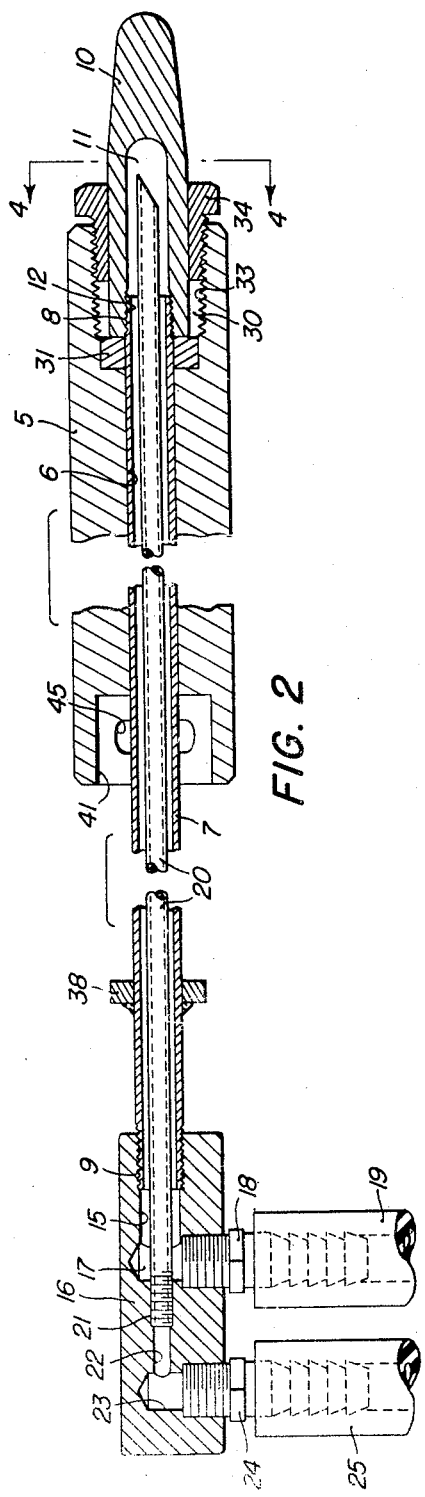
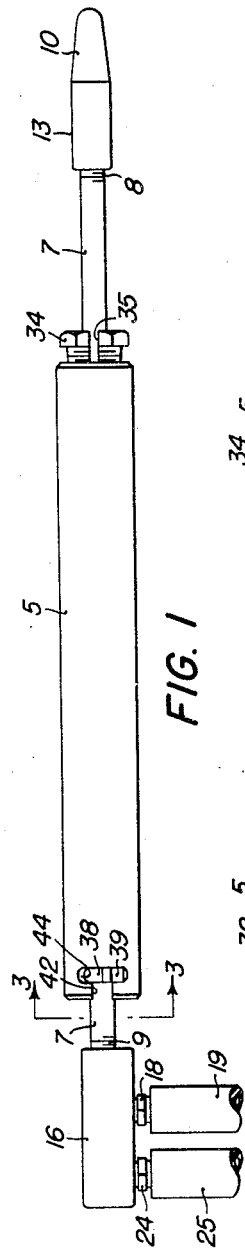
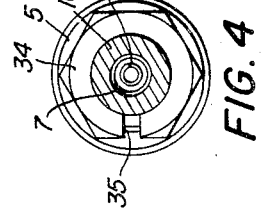
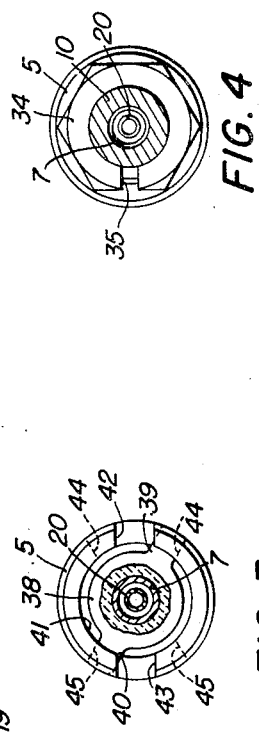
INVENTOR.
HAROLD A. JOHNSON
BY
ATTORNEY Patented Dec. 27, 1949

2,492,578

UNITED STATES PATENT OFFICE 2,492,578

WELDING ELECTRODE

Harold A. Johnson, Milan, Ill.

Application May 16, 1949, Serial No. 93,440

11 Claims. (Cl. 219—4)

The present invention relates to electrodes for use in spot welding, and has for its principal object the provision of a novel and improved fluid cooled welding electrode that is free from any tendency to leak during operation.

One of the serious problems encountered in the design of spot welding electrodes is that of preventing the leakage of the cooling water between the welding tip and the holder. Heretofore, the welding tips have either been threaded into the holder or have been tapered and pressed or driven into a tapered seat in the end of the holder. Inasmuch as the spot welding operation involves an appreciable mechanical pressure exerted through the holder to force the tip into contact with the piece to be welded, it is a frequent occurrence that the threads or tapered seats become damaged during welding operations. This results in a poor fit between new tips and the holder when worn tips are replaced.

Attempts have been made to eliminate leakage by providing packing or other sealing means in the joint between the tip and holder. However, this packing is also subjected to the pressure applied to the tip and consequently is short-lived. Since welding tips must be frequently replaced, it is usually necessary also to replace the packing, which is frequently damaged during removal of the tip as well as during the application of pressure.

A poor fit between the tip and holder not only results in leakage of cooling water but in increased electrical resistance and therefore greater heating in the contact area between the tip and holder.

A more specific object of my invention relates to the provision of a welding electrode in which the water connection between the tip and source of cooling water is not subjected to the mechanical force or pressure during the welding operation. In the accomplishment of this object I have provided an electrode in which the force is applied to the tip independent of the water connection thereto.

A further object of my invention relates to the provision of means for quickly and easily dismounting the tip from the holder with a minimum of tools required.

These and other objects and advantages of my invention will be apparent to those skilled in the art after a consideration of the following description of a preferred embodiment, in which reference will be made to the drawings appended hereto, in which Figure 1 is a side view of the electrode with the parts in position for removing or replacing a welding tip;

Figure 2 is an enlarged sectional view taken along an axis of the electrode, the parts being shown in normal operating position;

Figure 3 is a sectional view taken along a line 3—3 in Figure 1, but drawn to an enlarged scale; and Figure 4 is a sectional view taken along a line 4—4 in Figure 2.

Referring now to the drawings, the electrode includes a tubular holder 5, generally cylindrical in form and having an axially extending passage 6 between the two ends of the holder. A pipe 7 extends through the passage 6 and is slidable axially therein. The pipe 7 is appreciably longer than the holder and extends beyond both ends thereof as indicated in Figure 1. Both ends of the pipe 7 are threaded as indicated by reference numerals 8 and 9.

One threaded end 8 of the pipe 7 is adapted to receive a welding tip 10 which has a cylindrical body 13 which is recessed at one end to provide a chamber 11 for cooling water or other fluid. The chamber 11 is internally threaded at 12 to engage the threaded end 8 of the pipe 7 in watertight relation.

The opposite end 9 of the pipe 7 engages a threaded duct or passage 15 in a connector 16. The duct 15 intersects a transverse duct 17, into which is threaded a fitting 18 to which a flexible water hose 19 is coupled.

An inner tube 20 extends coaxially through the pipe 7 into the chamber 11; and the opposite end of the tube 20 is threaded at 21 to engage a threaded duct 22 in the connector 16. The duct 22 is an extension of the connector duct 15 but smaller in diameter and intersects a transverse duct 23 into which is threaded a second hose fitting 24, to which is attached a flexible water hose 25.

The assembly comprising the pipe 7, tip 10, tube 20, and connector 16, with its fittings 18, 24 and hoses 19, 25 can be slidably shifted relative to the holder 5 between the two positions illustrated in Figures 1 and 2. The passage 6 in the holder 5 has an enlarged portion 30 at one end into which the tip 10 is received in the operating position shown in Figure 2. At the inner end of the enlarged portion 30 is mounted a hardened bushing 31, which serves as an abutment for the inner end of the tip 10. The bushing 31 fits tightly in the holder and also serves as a bearing or guide for the pipe 7 as the latter slides axially therethrough.

The enlarged portion 30 of the passage is tapered to flare outwardly to the end of the holder and is internally threaded at 33. A clamping element in the form of a threaded bushing 34 encircles the tip 10 and is tapered to correspond to the tapered passage portion 30. The bushing 34 is split or slotted axially, as indicated at 35, thus rendering the bushing compressible as it is screwed into the inwardly tapering threaded portion 33, causing the bushing to clamp the cylindrical body 13 of the tip 10. When the bushing 34 is tightened into the tapered threads 33 the tip is fixedly secured to the holder and the clamping action of the bushing results in a low-resistance electrical connection with the holder 5.

The pipe 7 can be locked against turning relative to the holder 5 to facilitate unscrewing the tip 10 and replacing the latter. To this end I have provided cooperable locking elements in the form of a collar 38 welded or otherwise fixed to the pipe and having a pair of radially projecting lugs 39, 40 engageable with slots in the end of the holder opposite the welding tip. The end of the holder is recessed at 41 to receive the collar 38 when the pipe is shifted to the position shown in Figure 1. A pair of opposed axial slots 42, 43 receive the lugs 39, 40, respectively, and intersect a pair of circumferential slots 44, 45 which extend in both peripheral directions from the inner ends of the axial slots 42, 43, respectively.

Hence, it is evident that by shifting the connector 16 and pipe 7 toward the holder 5, the tip 10 is shifted out of the holder and the lugs 39, 40 enter the axial slots 42, 43. The pipe 7 can then be rotated through a limited angle in either direction to lock the lugs into the circumferential slots 44, 45. The direction of angular movement depends upon whether the operator desires to loosen or tighten either the tip 10 or the connector 16.

The operation of the welding electrode will now be described:

The pipe 7 is shifted to the position shown in Figure 1 with the locking lugs 39, 40 engaged with the slots 44, 45 in the holder, after which the tip 10 can be screwed tightly on the threaded end 8. The operator can hold the holder in one hand and tighten the tip with the other hand. The lugs 39, 40 prevent the pipe 7 from turning during installation of the tip and also prevents the pipe from dropping out of the holder after the tip is removed. With the bushing 34 loosened, the pipe 7 is then shifted to disengage the locking lugs 39, 40 from the slots 44, 45, out through the axial slots 42, 43, and to draw the tip 10 into the holder in abutment with the hardened steel bushing 31. The tapered bushing 34 is then screwed into the tapered threads 33 to clamp the tip firmly in the holder.

Water is then circulated into the hose 25, through the inner tube 20 into the chamber 11 and out through the space between the tube 20 and pipe 7, discharging through the hose 19. The electrical connections and supports for the holder are not shown, inasmuch as they are not a part of the present invention, but it will be evident to those skilled in the art that force or pressure applied to the tip is transmitted from the holder solely through the hardened bushing 31, independent of the water pipe 7. Thus no force is exerted on the pipe 7 and therefore there is no tendency to cause leakage. Since the threaded connection between the pipe 7 and tip 10 is tight, there is no necessity for sealing between the tip 10 and bushing 34, nor is there any mechanical force applied through the bushing 34, except the comparatively small amount required to establish a good electrical connection. There is, therefore, very little wear or damage to the threads 33 in the holder during operation or during replacement of the tip, nor is there any damage to the cylindrical outer surface 13 of the tip 10.

A tip, therefore, can be removed and later the same tip can be used again, unlike the present tips having tapered shanks, which are usually scored so badly that they cannot be used again after having once been removed.

Inasmuch as the threaded connections between the connector 16 and the pipe 7 can be made water-tight, there likewise is no necessity for any packing or sealing means at this end of the electrode.

I do not intend my invention to be limited to the particular details shown and described herein, except as set forth in the claims which follow.

I claim:

1. A welding electrode comprising a tubular holder, a tip mountable on one end of said holder and having a recess therein for cooling water, a pipe attached to the inner end of said tip in communication with said recess, said pipe extending axially through said holder, and an inner tube extending through said pipe into said recess.

2. A welding electrode comprising a tubular holder, a tip mountable on one end of said holder and having a recess therein for cooling water, a pipe attached to the inner end of said tip in communication with said recess, said pipe being slidable axially through said holder and normally extending beyond the latter, an inner tube extending through said pipe from said recess, connections for circulating water through said tubes and recess and detachable means for securing said tip rigidly in said one end of said holder.

3. A welding electrode comprising a holder having a passage extending therethrough, a pipe slidably disposed in said passage and extending beyond said holder, a tip adapted to be detachably connected to one end of said pipe and having a water chamber in communication with said pipe, an inner tube extending through said pipe into said chamber, said pipe being slidable through said passage to move said tip from a position spaced from the end of said holder in which attachment is conveniently accomplished, to an operating position in which said tip is inserted into the end of said passage in the holder and means for fixing said tip to said holder in said operating position.

4. A welding electrode comprising a holder having a passage extending therethrough, a pipe slidably disposed in said passage and extending beyond said holder, a tip having a recess in one end serving as a cooling water chamber, the end of said recess being threaded to detachably receive a threaded end of said pipe in water-tight relation, one end of said passage being enlarged to receive said tip when said pipe is shifted through said passage to move the tip into engagement with the inner end of the enlarged portion of the passage, and a clamping element engaging the end of said holder for fixing said tip in the end of the holder.

5. The combination set forth in claim 4, including the further provision of a hardened bushing within said enlarged end of said passage slidably encircling said pipe and serving as an abutment for the inner end of said tip.

6. The combination set forth in claim 4, including the further provision that said enlarged end of the passage is tapered and threaded and said clamping element comprising a split bushing embracing said tip and threadedly engaging the tapered passage.

7. The combination set forth in claim 4, including the further provision of cooperative locking elements on said pipe and said holder at the end opposite said tip, said elements being positioned to be interengageable with said pipe shifted to a position in which said tip is disposed outwardly of the passage.

8. A welding electrode comprising a holder having a passage extending therethrough, a pipe slidably disposed in said passage and extending beyond said holder, a tip adapted to be detachably connected to one end of said pipe and having a water chamber in communication with said pipe, an inner tube extending through said pipe into said chamber, said pipe being slidable through said passage to move said tip from a position spaced from the end of said holder in which attachment is conveniently accomplished, to an operating position in which said tip is inserted into the end of said passage in the holder, means for fixing said tip to said holder in said operating position, and cooperative locking elements on said pipe and said holder at the end opposite said tip, said elements being positioned to interengage when said pipe and tip are disposed in spaced relation to the end of said holder, whereby removal of said tip from said pipe is facilitated.

9. A welding electrode comprising a holder having a passage extending therethrough, a pipe slidably disposed in said passage and extending beyond said holder, a tip having a threaded connection with one end of said pipe and having a water chamber in communication with the pipe, an inner tube extending from said chamber through said pipe, connector means attached to the opposite ends of said pipe and tube for circulating water through said chamber, said pipe being slidable through said passage to move said tip from a position spaced from the end of said holder in which position said tip can be easily screwed on to the pipe, to an operating position in which said tip is received within the end of said passage in the holder, clamping means for securing said tip rigidly to said holder in said operating position, and a pair of cooperative elements on said pipe and said holder at the end opposite said tip, said elements being positioned to interengage when said pipe and tip are disposed in spaced relation to the end of said holder, whereby removal of said tip from said pipe is facilitated.

10. The combination set forth in claim 9, including the further provision that said cooperable elements comprise a radially extending lug fixed to said pipe and a radially extending slot in the adjacent end of said holder adapted to receive said lug.

11. The combination set forth in claim 9, including the further provision that said connector means and said pipe are coupled together by interengaging threads, the engagement and disengagement of which are facilitated by locking said pipe to said holder by said cooperative elements.

HAROLD A. JOHNSON.

REFERENCES CITED

The following references are of record in the file of this patent:

UNITED STATES PATENTS

| Number | Name | Date |
| --- | --- | --- |
| 1,058,677 | Taylor | Apr. 8, 1913 |
| 1,607,710 | Von Henke | Nov. 23, 1926 |
| 2,068,043 | Warnke | Jan. 19, 1937 |
| 2,208,977 | Hall | July 23, 1940 |
| 2,270,767 | Platz | Jan. 20, 1942 |
| 2,322,691 | Hensel | June 22, 1943 |
| 2,390,936 | Hall | Dec. 11, 1945 |
| 2,399,797 | Gross et al. | May 7, 1946 |
| 2,443,052 | Mullen | June 8, 1948 |